United States Patent
Boasson et al.

(10) Patent No.: US 6,944,118 B2
(45) Date of Patent: Sep. 13, 2005

(54) SYSTEM AND METHOD FOR COMMUNICATING DIGITAL INFORMATION USING TIME-AND-FREQUENCY-BOUNDED BASE FUNCTIONS

(75) Inventors: Erik Boasson, Borculo (NL); Maarten Boasson, Borculo (NL); Martin Streng, Hengelo (NL)

(73) Assignee: Bandwidth Technology Corp., New York, NY (US)

( * ) Notice: Subject to any disclaimer, the term of this patent is extended or adjusted under 35 U.S.C. 154(b) by 0 days.

(21) Appl. No.: 10/922,754

(22) Filed: Aug. 20, 2004

(65) Prior Publication Data

US 2005/0041620 A1 Feb. 24, 2005

Related U.S. Application Data

(63) Continuation-in-part of application No. 10/326,318, filed on Dec. 20, 2002, which is a continuation-in-part of application No. 10/215,806, filed on Aug. 8, 2002, which is a continuation-in-part of application No. 10/022,333, filed on Dec. 20, 2001, which is a continuation of application No. 09/120,448, filed on Jul. 22, 1998, now Pat. No. 6,404,779.
(60) Provisional application No. 60/061,335, filed on Oct. 8, 1997.

(51) Int. Cl.$^7$ .............................................. H04J 11/00

(52) U.S. Cl. ...................................................... 370/203

(58) Field of Search ................................ 370/203, 208, 370/210, 329, 330, 343, 345, 468, 478, 480, 498; 375/240, 240.18, 240.19, 295

(56) References Cited

U.S. PATENT DOCUMENTS 5,285,474 A * 2/1994 Chow et al. ................. 375/231
2005/0027528 A1 * 2/2005 Yantorno et al. ........... 704/246

* cited by examiner

Primary Examiner—Kwang Bin Yao
(74) Attorney, Agent, or Firm—David D. Lowry; Brown Rudnick Berlack Israels LLP

(57) ABSTRACT

Systems and methods for efficiently conveying one or more broadband communication channels over a transmission medium. Communication is effected by transforming an incoming digital bit stream into a Time-and-Frequency-Bounded (TFB) information stream that includes a plurality of TFB packets. This transformation is accomplished through the use of a plurality of TFB basis functions. The TFB information stream is then transmitted over the transmission medium. More particularly, digital bit streams carried on one or more incoming channels are in the form of binary "n" and "off" bits. These digital bits are converted into a plurality of TFB waveform components which together comprise a TFB packet. The conversion process maps each of respective incoming digital bits to a corresponding one of a group of TFB functions, such that a first group of n bits is mapped to a first TFB function, a second group is mapped to a second TFB function, and so on, until the Nth TFB function is reached, whereupon the process cycles back to the first TFB function. In any case, the value or status of a group of bits is represented by a corresponding weighing factor for the corresponding TFB function. When weighed, each respective TFB function specifies the transmission of a corresponding TFB waveform component. Each waveform component is substantially confined within a range of values in both the frequency and time domains.

70 Claims, 10 Drawing Sheets

SYSTEM AND METHOD FOR COMMUNICATING DIGITAL INFORMATION USING TIME-AND-FREQUENCY-BOUNDED BASE FUNCTIONS

RELATED APPLICATIONS

The present application is a continuation-in-part of U.S. application Ser. No. 10/326,318 filed on Dec. 20, 2002 which is a continuation-in-part of application Ser. No. 10/215,806 filed on Aug. 8, 2002; which is a continuation-in-part of application Ser. No. 10/022,333 filed on Dec. 20, 2001; which is a continuation of U.S. application Ser. No. 09/120,498, issued U.S. Pat. No. 6,404,779 filed on Jul. 22, 1998; which claims priority from U.S. provisional application No. 60/061,335 filed on Oct. 8, 1997; which all are hereby incorporated by reference. The present application also claims priority from PCT application PCT/NL03/00911 filed on Dec. 19, 2003, which is also hereby incorporated by reference.

BACKGROUND OF THE INVENTION

1. Field of the Invention

This invention relates to digital communications techniques, and more specifically, to systems and methods for increasing the effective data throughput of a transmission medium through the use of Time-and-Frequency Bounded base functions.

2. Description of Background Art

Traditional phone service, commonly referred to as "POTS" for plain old telephone service, connects remotely-situated telephones to a telephone company central office using twisted pairs of copper wire. Traditional phone service was created to enable an exchange of voice information with other phone users using analog signal transmission. More specifically, a POTS telephone set takes an acoustic signal, which is a natural analog signal, and converts it into an electrical equivalent in terms of volume (signal amplitude) and pitch (frequency) for transmission over a copper wire pair.

As technology evolved, a need soon developed to provide for the exchange of digital data between two remotely-situated computing devices. Although the telephone network (local loop) is geared to analog, not digital, signal transmission, it was nonetheless possible to convey digital data from one location to another by encoding digital data as an analog signal, sending the analog signal over the copper wire pair, and decoding the analog signal at a remote location to retrieve the original digital data. These encoding and decoding steps are typically performed by computer modems.

Due to the fact that traditional analog voice transmission uses only a small portion of the bandwidth available with copper wire, the maximum amount of data that can be transmitted with computer modems communicating using the so-called voice channel is approximately 56 Kbps. The ability of computer modems to exchange data is constrained by the fact that the telephone company limits the bandwidth of the communication between POTS users to 4 kHz approximately.

Digital Subscriber Line (DSL) is a communications technique in which the constraint on frequencies is very much relaxed. Typically, frequencies in the range of roughly 25 . . . 1100 kHz are used for transmitting data between DSL modems. This allows concurrent use of the wire for data transmission and voice communication. The greater bandwidth available for data communication results in much greater data rates than were previously possible when only the voice channel was available. Note that in contrast with traditional modems, there need to be DSL modems at both ends of the local loop, i.e. one at the subscriber premises, and one in the telephone company central office.

At present, DSL is used to provide high bandwidth communication links to homes and offices over ordinary telephone lines. But, although theoretical DSL bandwidths are high relative to conventional 56K modem technology, one or more practical considerations may significantly limit the actually achieved bandwidth to a much lower number. For example, if a home or business is located quite close to a telephone company central office, illustratively at a distance of less than half a mile, the customer may be able to receive data at rates up to 6.1 megabits per second of a theoretical 8.448 megabits per second, enabling continuous transmission of motion video, audio, and even 3-D effects. Under more typical conditions in the United States, individual DSL connections will provide from 1.544 Mbps to 512 Kbps downstream and about 128 Kbps upstream.

The maximum range for DSL without a repeater is 18,000 feet (5.5 kilometers). As distance decreases towards the telephone company central office, the achievable data rate increases. Another factor is the gauge of the copper wire. The heavier 24-gauge wire carries the same data rate farther than 26-gauge wire. Beyond the 5.5-kilometer range, DSL service is possible if the telephone company has extended the central office local loop via one or more fiber optic cables, thus effectively reducing the length of the copper wire in the connection.

Several modulation techniques are being used by various types of DSL, although these are being standardized by the International Telecommunications Union (ITU). Different DSL modem makers are using either Discrete Multitone Technology (DMT) or Carrierless Amplitude Phase Modulation (CAP)

In the United States, several telephone companies are currently offering DSL services. But, unfortunately, many consumers are unable to take advantage of these offerings due to the fact that they are located too far from the central office, and the cost of installing extended subscriber loops via fiber optic cables is prohibitive. This problem is especially prevalent in outer-ring suburban and rural areas where homes are often situated on large tracts of land, and the nearest central office is many miles away.

Another shortcoming of DSL is the oftentimes large gap between what is promised by the telephone companies and what is actually achieved in practice. Many consumers have paid a high premium to "trade up" to DSL, only to be disappointed in lower-than-expected data transfer rates and inconsistent performance.

In view of the aforementioned considerations, an improved technique for transmitting high-bandwidth information over conventional telephone lines is needed.

Data to be communicated is represented in binary digits. A transmission medium connecting a transmitter and receiver of the system is capable of transporting signals, which can be disturbed by the environment, including signals between other pairs of communicating devices (cross talk). There also may be (regulatory) constraints on the power of the signal inserted in the transmission medium. The transmitter generates a signal, driving the transmission line with a signal equivalent to an encoded input sequence. The receiver receives the signal and converts that signal into an output sequence, which is a copy of the input sequence if no errors occur. The transmitter and receiver devices combined allow for calibration, providing a means for the devices together to compensate for certain types of distortion occurring in the transmission medium. The system must also ensure that the receiver can generate a local clock, appropriate for the reception and conversion of the transmitted signal into the output sequence.

OBJECTS AND SUMMARY OF THE INVENTION

In view of the foregoing deficiencies, a primary object of the invention is to provide techniques for increasing the effective digital data throughput of a communications link which may include any of a wired transmission medium, a wireless transmission link, a satellite link, and possibly a fiber optic communication network.

More particularly, an object of this invention is to provide systems and methods in which the effective capacity of a communications link is enhanced.

A further object of the invention is to provide systems and methods which are more robust against interference on the communications link than current systems and methods.

Briefly stated, these and other objects of the invention are attained in the form of systems and methods by means of which data throughput is enhanced by transforming an incoming bit stream into one or more Time-and-Frequency-Bounded (TFB) packets that each include a plurality of TFB waveform components. This transformation is accomplished by mapping incoming bits to a set of TFB functions, such that respective TFB functions in the set of functions are awarded a characteristic weighing factor, corresponding to a value or status of corresponding bits. A plurality of weighted TFB functions are combined to generate the TFB packets. These TFB packets are then combined into a TFB information stream that is transmitted over the communications link.

The Time-and-Frequency-Bounded (TFB) functions are functions that exhibit the following properties:

each function f in this class is smooth, for each function f in this class and for any polynomial p(t), given any $\epsilon>0$, there exists a T such that for $|t|>T$, $|f(t)\ p(t)|<\epsilon$, in other words each function in this class has a limited extent in the time domain beyond which the amplitude of the product of the function and any polynomial is negligible or at least lower than a predetermined threshold value $\epsilon$, and for the Fourier transform $F(\omega)$ of the function f, and for any polynomial $p(\omega)$, given an $\epsilon>0$, there exists an $\Omega$ such that for $|\omega|>\Omega$, $|F(\omega)\ p(\omega)|<\epsilon$, in other words each function this class has a limited extent in the frequency domain beyond which the amplitude of the product of the function and any polynomial is negligible or at least lower than the predetermined threshold value $\epsilon$.

This unique and heretofore unexploited property of time and frequency confinement is especially useful in situations where it is desired to provide all or a portion of the communications link using a single transmission medium or channel.

Illustratively, given a number of optimized TFB waveforms, the width of a frequency band they occupy can be set by scaling their time variables. In this manner a variable number of frequency bands of arbitrary widths can be employed. Optimizing the TFB waveforms for occupying relatively narrow frequency bands, by scaling their time variables accordingly, allows more efficient use of available bandwidth and the effect of an RF interference source is limited to the small frequency band of the interference source, having little effect on the communications link as a whole.

A particularly suitable sub-class of TFB functions are orthogonal TFB functions. From this sub-class, Hermite-Gauss functions are a preferred embodiment. It is noted that a system using Hermite-Gauss functions per se is known from U.S. Pat. No. 3,384,715.

Pursuant to a further embodiment of the invention, the incoming bits comprise the digital bit stream (input sequence) carried on one or more incoming channels in the form of binary "on" and "off" bits. Given a collection of preferably linearly independent TFB functions, called base functions, data is encoded by mapping bits from a representation of the data to at least approximations of the base functions. The input sequence is encoded in blocks. In the remainder these will be referred to as TFB blocks The TFB blocks are constructed from N different base functions, N being the number of functions used for encoding (as used herein, N is a positive integer). Illustratively this mapping process is implemented by mapping a first incoming bit to a first TFB function, a second incoming bit to a second TFB function, and so on, until an $N^{th}$ TFB function is reached, whereupon the process cycles back to the first TFB function. Note that the mapping of one bit to one TFB function is descriptive only, and that in practice multiple bits may be mapped onto a single TFB function. Preferably the incoming stream of bits is buffered prior to encoding.

In a further embodiment the bits are grouped in groups of length M, where M depends on the number of bits needed for error correction; N-M bits are added for this error correction. The first M bits of the not yet encoded input sequence, and N-M error correction bits, are then mapped onto N different base functions. Note that both M and N may be defined dynamically, possibly per block. This encoding can be repeated indefinitely. In case there are insufficient data in the input sequence to fill the block, padding bits are generated preferably.

Illustratively mapping is achieved by multiplying an $i^{th}$ function from a selected set of TFB functions with a first weighing factor, e.g. −1, if an $i^{th}$ bit=0 or with a second, different, weighing factor, e.g. +1, if the $i^{th}$ bit=1, and subsequently adding all N thus weighted functions to form the TFB block, in such a way that the reconstruction after transmission in a decoder yields the input sequence with some probability P. The weighing factors are by no means limited to −1 and +1 and can be chosen freely to suit application or system requirements. Each respective weighed TFB function constitutes a component of the TFB waveform that is to be transmitted. Each of respective weighed TFB functions possesses a corresponding set of frequency components and lasts for a corresponding length of time.

Illustratively, the predetermined TFB functions could all specify substantially the same length of time, but this is not a requirement. For instance, a first predetermined TFB function could be utilized that has a different time duration than a second predetermined TFB function.

Illustratively, a set of TFB functions could be selected which fit within a predetermined frequency range. In such a scenario, the time durations of "interesting" (non-zero) parts of the functions will differ from function to function. However, centers of the interesting parts of the functions can be made to substantially coincide in time for all functions in the set of TFB functions.

Pursuant to another embodiment of the invention, the TFB blocks are transformed into TFB packets by modulating the block waveform with e.g. a central frequency of the channel to be used for the transmission of this group of bits and subsequently generating a waveform corresponding to a modulated function. Additional to or instead of modulation, processing may be added to compensate, either fully or in part, for the effect of the transmission medium. TFB blocks may also be transformed into TFB packets without applying additional signal processing to the blocks.

Illustratively the resulting packets are transmitted over a physical transmission medium. The packets are preferably transmitted in the order in which the parent blocks were constructed. Illustratively the transmitted packets are temporally spaced. Packets may be sent in a non-continuous stream. A waveform corresponding to the packet sequence is generated and physically realized on the transmission medium Pursuant to another embodiment of the invention, the waveform, as realized in a transmitter and distorted while propagated over the transmission medium, is retrieved from the transmission medium by a receiver. Illustratively, a distorted waveform is processed for compensation of the effect of the transmission medium on the waveform and/or demodulation with a carrier frequency and/or filtering, e.g. for limiting a frequency range of the signal, resulting in a sequence of noisy packets. Compensation for a distortion introduced by the transmission medium can be incorporated in the base functions; in such a case a collection of base functions may vary, possibly per block. Compensation for cross talk induced during transmission may be included in processing in both the transmitter and the receiver.

Accordingly, pursuant to another embodiment of the invention, receiving devices and methods are disclosed for receiving, detecting, and decoding an incoming TFB composite information stream. Both encoding and decoding may contain mechanisms for error correction. The TFB functions may be detected by the receiver based upon frequency domain characteristics, time domain characteristics, or both.

According to another embodiment of the invention, the receiver transforms a signal received on the transmission medium connecting the receiver with the transmitter into the bit sequence that was used by that transmitter for generating the received signal. This process preferably involves converting an analog signal into a sampled stream of bits. Illustratively the, digitally encoded, signal is demodulated. The sampled signal can be matched with a set of TFB functions in order to determine the weighing factor for each of the functions in the set. This results in bit i being set to 0 if that factor is e.g. −1, or to 1 if the factor is e.g. +1 (other weighing factors and protocols are of course possible and lie within the scope of the invention). Thus, an $i^{th}$ function maps onto an $i^{th}$ bit in the sequence generated for a single packet.

In a further embodiment determining the weighing factors provides information on noise generated in the communication link, which is then estimated and sent back to the transmitter for adaptation of the encoding, if necessary Pursuant to another embodiment of the invention, decoding information is extracted and the noisy packets are decoded using at least approximations of N TFB functions. Illustratively, functions used for decoding may be different from functions used for encoding. Noisy packets are decomposed into N weights, one for each of the base functions used for decoding. The resulting N weighing factors are mapped onto N bits in such a way that the input sequence is reconstructed with the probability P as described above. Illustratively, the extracted bits are processed with an error correction algorithm matching the algorithm used for encoding so that the original input bit sequence results. The resulting bits are made available as output sequence. Preferably the output bit sequence is placed in a buffer and made available for external equipment, such as a computer.

Illustratively, each of the steps involved in processing of the received signal may be carried out in an analog and/or digital fashion. The functions used for decoding may be digitized before application in decoding of the received signal.

This invention can be used to increase bandwidth capacity on existing transmission media and/or in conjunction with satellite transmission protocols. This invention has the following advantages:

(a) The channels made by modulating streams of TFB packets onto a number of carrier frequencies, each having a certain bandwidth, can be placed close to each other due to the limited extent of the TFB functions.

(b) It can be applied to any digital transmission protocol.

(c) It can be applied to any medium capable of carrying electronically-coded digital information.

(d) It can carry a large number of unique voice and data channels on a single line.

(e) It does not rely on compression to increase bandwidth.

(f) It provides a means of increasing bandwidth using existing infrastructure.

(g) It can be used to implement communication systems having the spectral properties of each of the current DSL variants, such as ADSL, SDSL, and VDSL because of the improved control over the spectrum due to the limited extent of TFB functions.

While various preferred embodiments of TFB encoding and decoding techniques have been disclosed herein, it is to be understood that many changes may be made therein without departing from the spirit of the invention.

Thus, the aforementioned techniques can be applied not only to the communication of digital information, but also e.g. to its storage in which one or more digital information streams are stored on a storage medium based on analog techniques.

BRIEF DESCRIPTION OF THE DRAWINGS

For a better understanding of the invention, as well as other objects and features thereof, reference is made to the accompanying drawings wherein.

DETAILED DESCRIPTION OF THE PREFERRED EMBODIMENTS

Figure 1A:
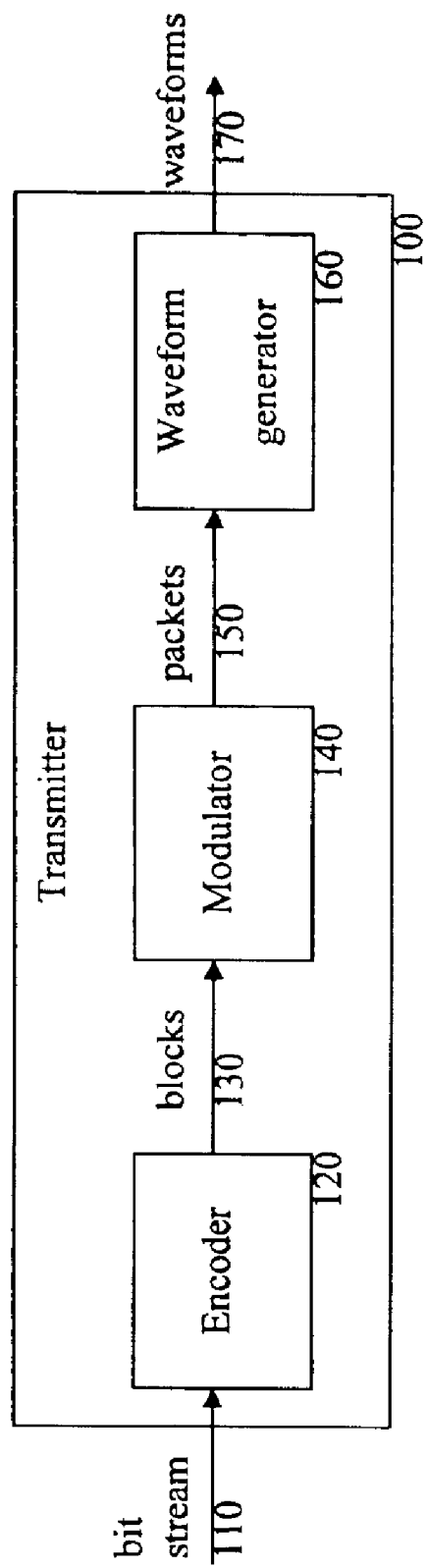
FIG. 1A is a block diagram setting forth an illustrative implementation of a transmitter of a system according to the present invention equipped to convert incoming binary data into a TFB packet stream for transmission over a communications link.

The systems and methods of the present invention enhance effective capacity of communications links or storage media by transmitting a plurality of TFB waveform components each characterized by a unique TFB function. A combination of TFB functions is used to construct a TFB packet, and a plurality of TFB packets is used to generate a TFB stream.

Pursuant to a first embodiment of the invention that increases effective data throughput of the communications link, incoming information is received as a bit stream of binary coded information ("0"s and "1"s),and then transformed to an equivalent coding in which the binary "0" and "1" of the bit stream, are translated into equivalent weighing factors to be applied to a TFB function selected from a set of predetermined TFB functions as described below. Note that the mapping of a single bit to a TFB function is by way of illustration only, and by no means a constraint. It is possible to map a number of bits onto a single TFB function.

Conceptually, the TFB packet is constructed from a set of TFB functions. These functions are utilized, potentially in a modified form, to encode a sequence of bits as a continuous-time signal, and to decode this signal into the sequence of bits that it represents. Encoding occurs by computing a weighted sum, also called a linear combination, of the TFB functions. The weight for a given TFB function is given by the weighing factor for a bit or group of bits mapped onto that function.

Fundamentally, TFB functions have the advantageous property of being substantially confined in both of the frequency and the time domain. A preferred sub-class of TFB functions are orthogonal TFB functions. Each TFB waveform component in the predetermined set of orthogonal TFB waveform components is unique and mutually orthogonal with respect to all other TFB waveform components in this set. A more preferred sub-class of the orthogonal TFB functions are Hermite-Gaussian functions. A Hermite-Gaussian function is a function that has the same shape (modulo a constant) in both the frequency domain and the time domain. The invention comprises the use of both Hermite-Gaussian functions and other TFB functions. An example of a TFB function is $$sech(z)=1/cosh(z)=2/(e^z+e^-z).$$

The TFB functions are summed, after the weighting process described above, thereby providing TFB blocks and, thence, a stream of TFB blocks.

Methods and systems in accordance with the invention may be used in conjunction with any transmission medium capable of conveying or transmitting a stream of information. Such transmission media may include wire, satellite transmission, wireless communications, radio frequency transmission over the air, radio frequency transmission through a coaxial cable, fiber optics, etc. and such protocols as T-1, ATM, Frame Relay, etc. Systems and methods developed in accordance with the invention will function with virtually any digital information capable of being transmitted or stored using analog technology, such as data, image, video or voice applications.

FIG. 1A is a block diagram setting forth an illustrative implementation of a transmitter 100 of a system according to the present invention equipped to convert incoming binary data into a TFB stream for transmission over a transmission medium to a receiver. An incoming binary data bit stream 110 includes a sequence of logical "1"s and "0"s. This bit stream 110 may originate from, for example, but not limited to, a computing device such as a personal computer, server, or computer-readable data storage device, and/or from a telephonic or other communications device. The incoming bit stream 110 is converted into TFB blocks 130 by an encoder 120, which will be described in more detail hereinafter with respect to FIG. 1B. The TFB blocks 130 are transformed into TFB packets 150 by modulating the block waveform with e.g. the central frequency of the channel to be used for transmission of this group of bits by a modulator 140. Additional to or instead of modulation processing may be added to compensate, either fully or in part, for the effect of the transmission medium. In an alternative embodiment TFB blocks 130 may also be transformed into TFB packets 150 without applying additional signal processing to the blocks 130. Subsequently, a waveform 170 corresponding to the TFB packet 150 is generated by a waveform generator 160 and physically realized on the transmission medium. The waveform generator 160 will be described in more detail hereinbelow with respect to FIG. 1C.

Figure 1B:
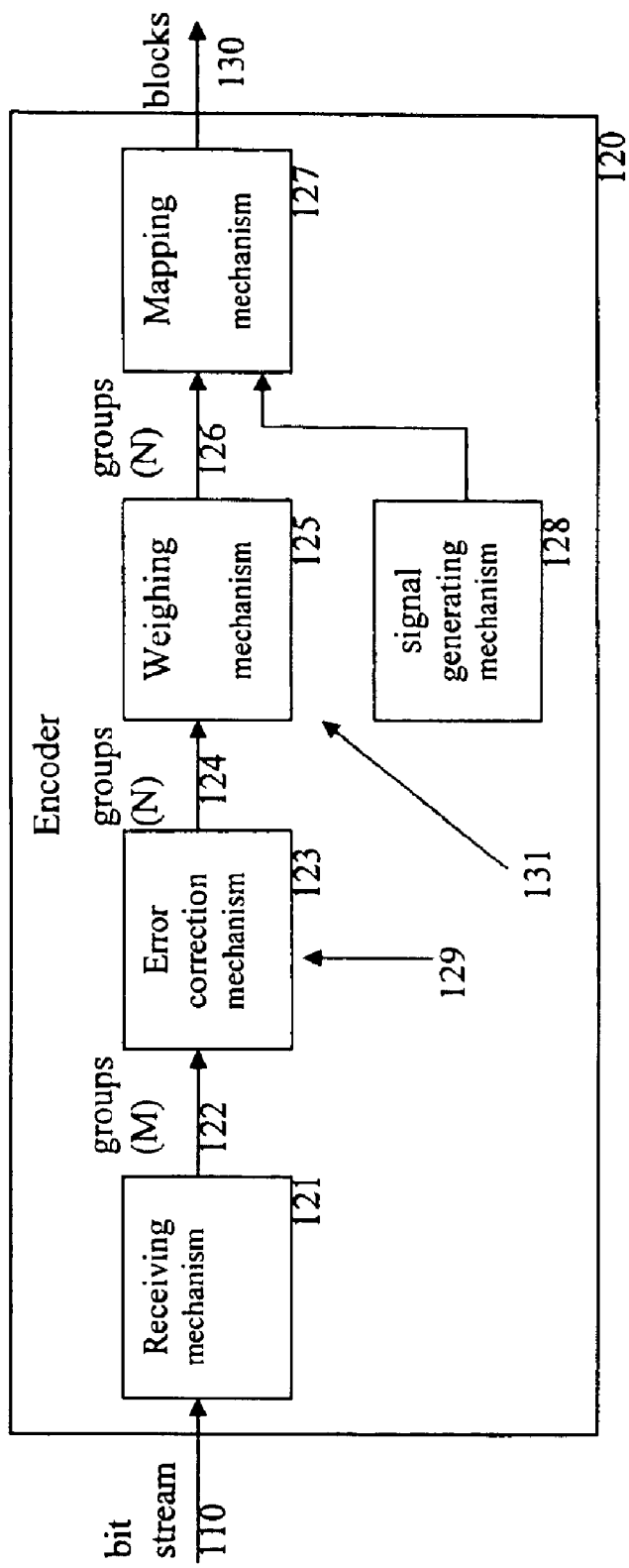
FIG. 1B is a block diagram representing an illustrative implementation of an encoder of the transmitter shown in FIG. 1A.

FIG. 1B is a block diagram representing an illustrative implementation of the encoder 120 of the transmitter 100 shown in FIG. 1A. The incoming bit stream 110 may be buffered in a receiving mechanism 121 before being encoded. The incoming bits are grouped in groups 122 of length M. An error correction mechanism 123 may add N-M bits for error correction, thus obtaining a group 124 of length N containing M bits of data and N-M error correction bits. Group length N corresponds to the number of TFB functions used for encoding and on the number of bits mapped onto a single TFB function. Both M and N may be determined dynamically, possibly per block. The error correction mechanism may be arranged to receive information on the quality of the transmission and/or the transmission medium on an input 129 to optimize the error correction algorithm depending on effects of the transmission and/or the transmission medium. In case there are insufficient data in the input sequence to fill a block 130, padding bits may be added to the group 122 or 124. In a weighing mechanism 125, for each bit in the group 124 a weighing factor is determined, which is to reflect the value of the bit ("0" or "1"). As an example, the weighing factor is −1 if the bit value is 0, and +1 if the bit value is 1. The weighing mechanism may be arranged to receive information on the quality of the transmission and/or the transmission medium on an input 131 for optimizing the weight generation, given the conditions of the transmission and/or the transmission medium. The weighing factors are by no means limited to the example given above and can be chosen freely to suit the application or system needs. A mapping mechanism 127 maps the N bits of the group 124 of bits onto N TFB functions, generated by a signal generation mechanism 128. The signal generation mechanism 128 may be arranged to receive information on the quality of the transmission and/or the transmission medium for optimizing the TFB functions, given the conditions of the transmission and/or the transmission medium Preferably the TFB functions are digital representations of TFB functions. It is, however, also possible to use analog, physical representations of the TFB functions. This mapping is achieved by multiplying a first function from a selected set of TFB functions with a first weighing factor, a second function with a second weighing factor and so on until all N functions have been multiplied with a weighing factor. Preferably, the first function is multiplied by a weighing factor corresponding to the first bit of the group 124, the second function with a weighing factor corresponding to the second bit of the group 124 and so on. Subsequently, the mapping mechanism 125 adds all N thus weighted functions to form a TFB block 130.

If n bits are to be mapped onto each TFB function, and there are NT TFB functions to be used, the bits are grouped in groups of $N=n \times N_T$ bits (incoming bits plus error correction bits). In the weighing mechanism 125, for each set of n bits in the group 124 a weighing factor is determined, which is to reflect the value of the set of bits. The mapping mechanism 127 maps the N bits of the group 124 of bits onto $N_T$ TFB functions, generated by the signal generation mechanism 128. This mapping is, again, achieved by multiplying the first function from the selected set of TFB functions with the first weighing factor, the second function with the second weighing factor and so on until all $N_T$ functions have been multiplied with a weighing factor. Preferably, the first function is multiplied by a weighing factor corresponding to the first set of n bits of the group 124, the second function with a weighing factor corresponding to the second set of n bits of the group 124 and so on. Subsequently, the mapping mechanism 125 adds all $N_T$ thus weighted functions to form a TFB block 130.

Figure 1C:
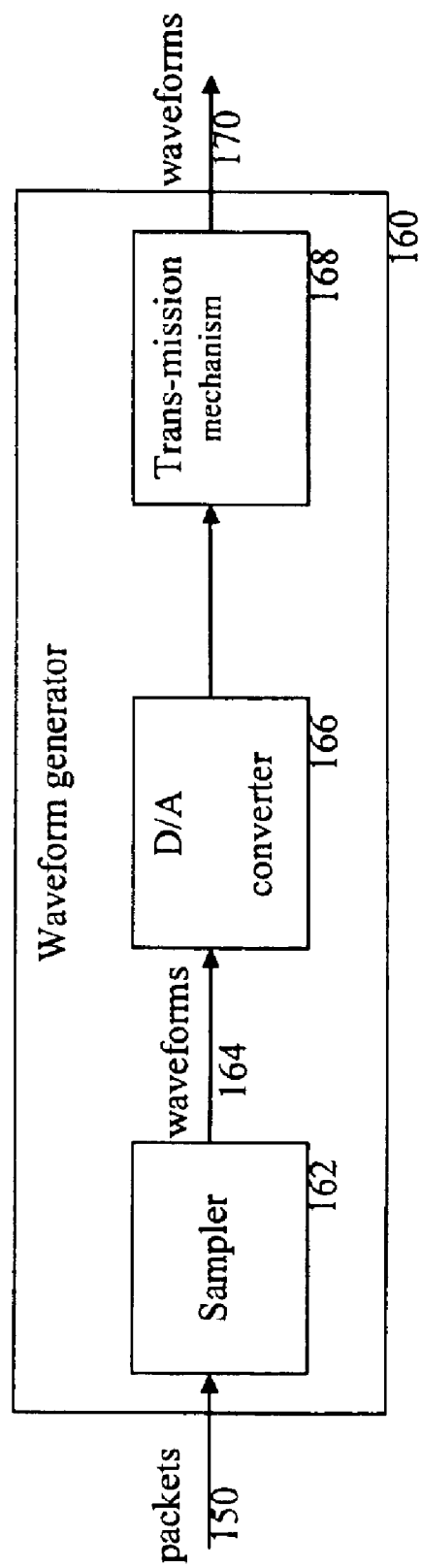
FIG. 1C is a block diagram representing an illustrative implementation of a waveform generator of the transmitter shown in FIG. 1A.

FIG. 1C is a block diagram representing an illustrative implementation of the waveform generator 160 of the transmitter 100 shown in FIG. 1A. A sampler 162 is used to determine a digital representation 164 of the waveform of the packet 150 as generated by the modulator 140. A Digital-to-Analog (D/A) converter 166 converts the digital waveform 164 into an analog waveform. A transmission mechanism 168, finally, puts the analog TFB waveform 170 on the transmission medium.

In the embodiment depicted by FIGS. 1A, 1B and 1C the incoming bits 110 are digitally mapped on digital representations of the N TFB functions, the sum of which (block 130) is digitally determined and modulated before being converted to an analog waveform 170 which is put on the transmission medium. The invention is by no means limited to this embodiment. Alternative embodiments, wherein the incoming bit stream 110 is converted to an analog signal at a different point within the system all fall within the scope of the invention. Examples are multiplying N analog TFB functions with analog equivalents of the weighing factors or converting the N digitally weighed functions to analog waveforms prior to adding the separate waveforms to form a block. Further, the invention could be embodied electronically, in firmware, in software, in hardware or in various combinations thereof.

Figure 2A:
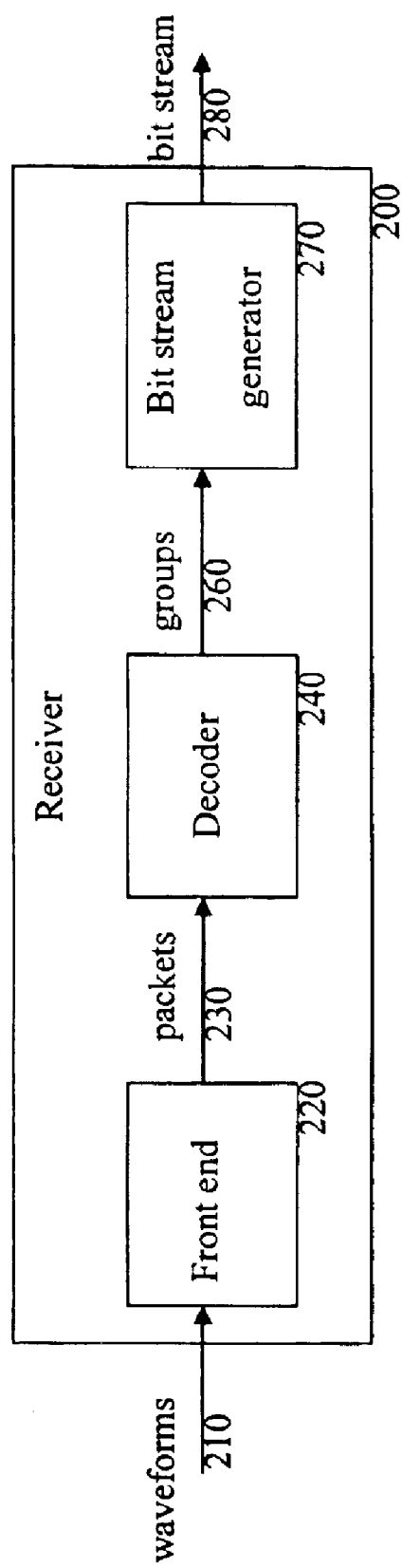
FIG. 2A is a block diagram setting forth an illustrative implementation of a receiver of the system according to the present invention equipped to decode an incoming TFB packet into one or more streams of binary data.

FIG. 2A is a block diagram setting forth an illustrative implementation of a receiver 200 of the system according to the present invention equipped to decode an incoming TFB waveform 210 into one or more streams of binary data 280. A front end 220 of the receiver 200 receives waveforms 210 from the transmission medium. As described hereinafter in more detail with respect to FIG. 2A the front end 220 converts the received waveform 210 to a sampled packet 230. A decoder 240 decomposes the packet 230 into a group 260 of bits as described below with respect to FIG. 2C. Finally, the bit groups 260 are restored to a bit stream 280 by a bit stream generator 270 as described in more detail hereinbelow with respect to FIG. 2D.

Figure 2B:
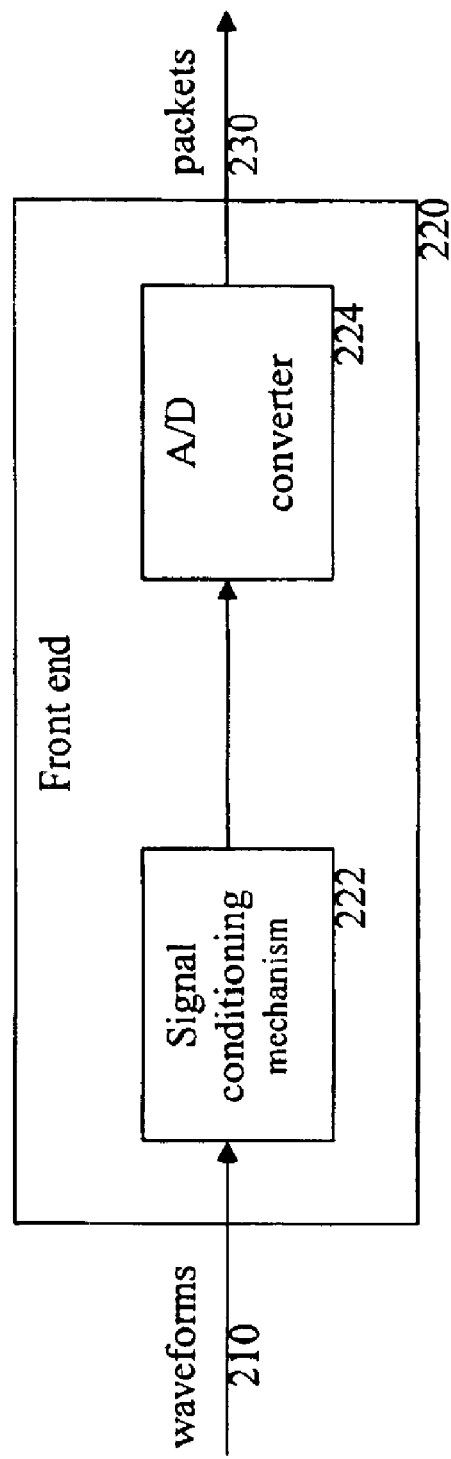
FIG. 2B is a block diagram representing an illustrative implementation of a front end of the receiver shown in FIG. 2A.

FIG. 2B is a block diagram representing an illustrative implementation of the front end 220 of the receiver 200 shown in FIG. 2A. The front end 220 receives an analog waveform signal 210 from the transmission medium, e.g. a wire. The incoming signal may be conditioned to improve the amplitude and/or signal to noise ratio in a signal conditioning mechanism 222. An Analog-to-Digital (A/D) converter 224 generates a digital sampled packet 230 corresponding to the received analog waveform 210.

Figure 2C:
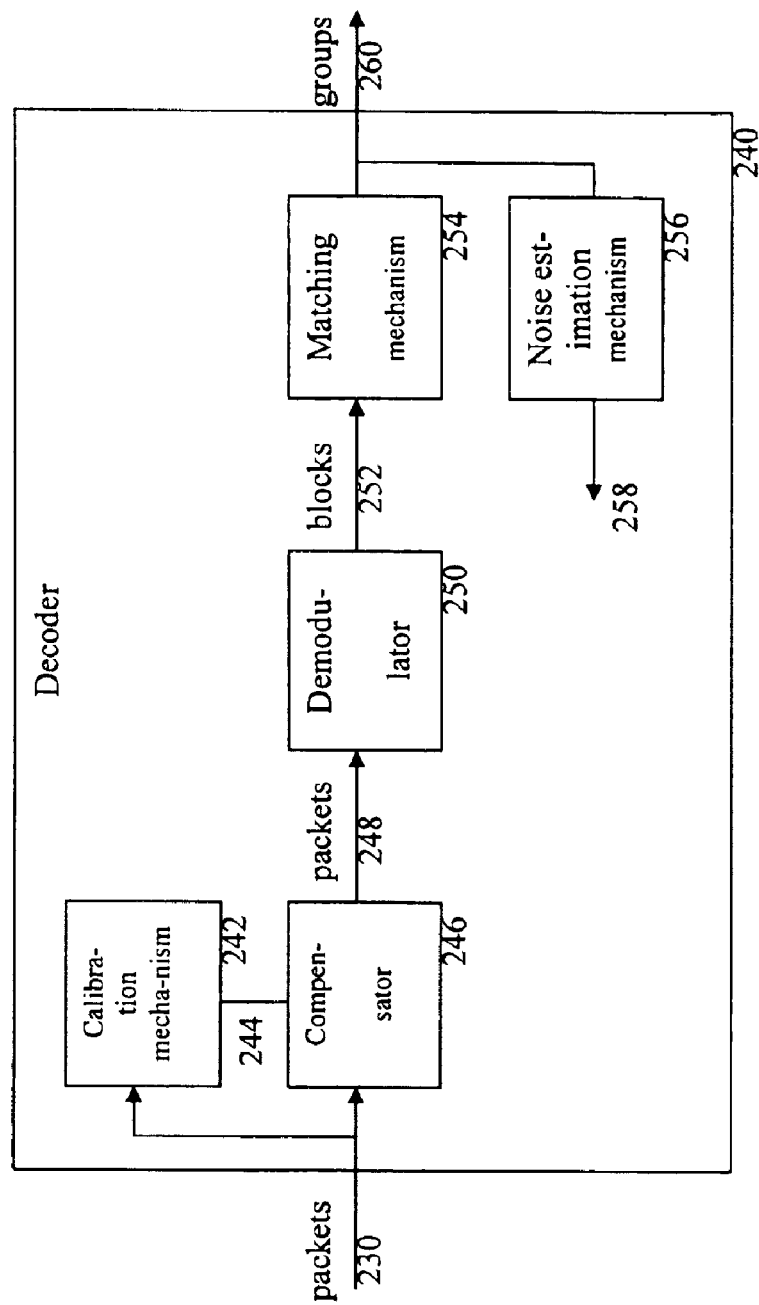
FIG. 2C is a block diagram representing an illustrative implementation of a decoder of the receiver shown in FIG. 2A.

FIG. 2C is a block diagram representing an illustrative implementation of the decoder 240 of the receiver 200 shown in FIG. 2A. As a waveform 170, as realized in the transmitter, may be distorted while propagated over the transmission medium, the distorted waveform 210 may be processed for compensation of the effect of the transmission and/or the transmission medium, e.g. noise, attenuation and phase shifts, on the waveform by a compensator mechanism 246 yielding compensated received packets 248. In an alternative embodiment compensation for the distortion introduced by the transmission medium can also be incorporated in the base functions; in such a case the collection of base functions may vary, possibly per block. Illustratively, compensation for cross talk induced during transmission may be included in processing in both the transmitter 100 and the receiver 200. A calibration mechanism 242 may be used to determine the parameters that govern the compensation by comparing the received waveform 210 with a known sent waveform. A demodulator 250 demodulates the (digitally encoded) packets 248 with a carrier frequency for each channel used in the transmission, resulting in sampled blocks 252. In a matching mechanism 254 the sampled blocks 252 are matched with a set of TFB functions in order to determine a weighing factor for each of the functions in the set. Illustratively, this results in bit i being set to 0 if that weighing factor is −1, or to 1 if the weighing factor is +1, in the case of the weighing factors given in the example above. The weighing factors are by no means limited to the example and can be chosen freely to suit the application or system needs. Illustratively, an $i^{th}$ function maps onto an $i^{th}$ bit in the sequence generated for a single block 252. The resulting N weighing factors are mapped onto a group 260 of N bits in such a way that the input block 124 is reconstructed with the probability P. Illustratively, the matching is done by computing an approximation of the inner products of the received packets 248 with the TFB functions used to decode the data. The matching process provides information on noise generated in the transmission and/or transmission medium, which is then estimated by a noise estimation mechanism 256 and sent back 258 to the transmitter for adaptation of the encoding, if required. In the transmitter 100 this information can, for example, be directed to the input 129 of the error correction mechanism for optimizing the error correction algorithm, and/or to the input 131 of the weighing mechanism to be used in optimizing the weights applied to the TFB functions, given the effects of the transmission medium. The information can also be used to modify the set of TFB functions used within the transmitter. It is also possible to use information that has not been estimated by the estimation mechanism 256, e.g. from a separate measurement, for optimization.

Figure 2D:
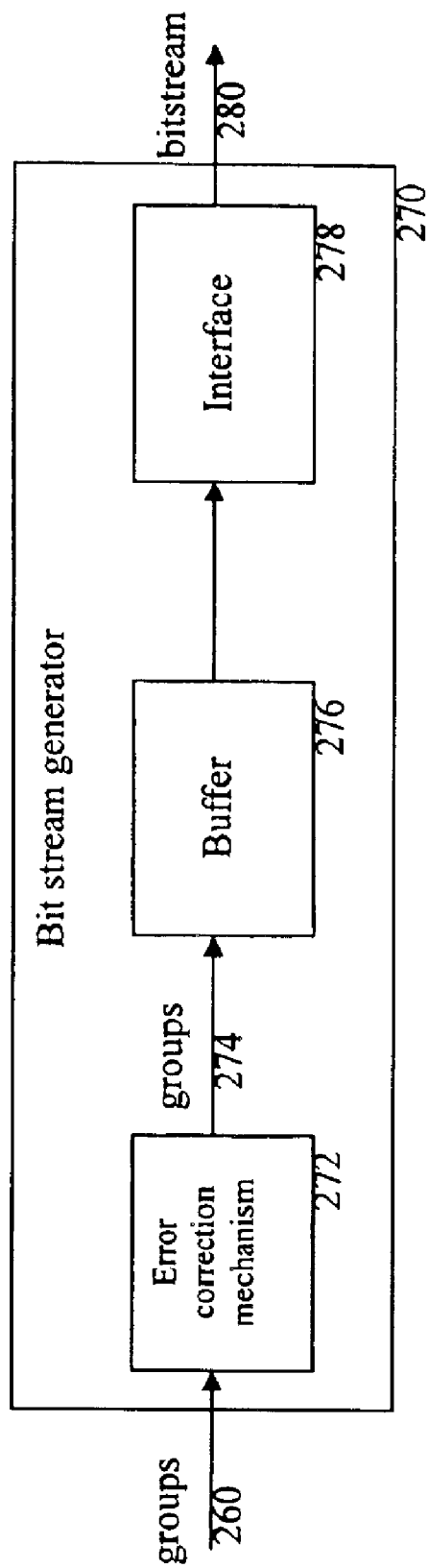
FIG. 2D is a block diagram representing an illustrative implementation of a bit stream generator of the receiver shown in FIG. 2A.

FIG. 2D is a block diagram representing an illustrative implementation of the bit stream generator 270 of the receiver 200 shown in FIG. 2A. The M data bits in the groups 260 extracted in the matching mechanism 254 are processed with an error correction algorithm, in an error correction mechanism 272, matching an algorithm used for encoding, so that the original bit sequence results. Group 274 of M decoded bits is placed in a buffer 276 and, after being concatenated, the resulting bit stream 280 is made available for external equipment, such as a computer, by an interface mechanism 278.

In the embodiment depicted by FIGS. 2A, 2B, 2C and 2D the incoming waveforms 210 are digitized after signal conditioning and before compensation. The invention is by no means limited to this embodiment. Alternative embodiments, wherein the incoming waveform 210 is converted to digital data at a different point within the system all fall within the scope of the invention. Examples are digitally applying signal conditioning or compensating for e.g. attenuation in an analog fashion. Further, the invention could be embodied electronically, in firmware, in software, in hardware or in various combinations thereof.

The hardware embodiments of FIGS. 1A and 2A may be employed to create multiple channels using frequency division multiplexing (FDM) where each of the channels consists of a stream of packets. Each of these packets, in turn, is constructed from weighted sums of a set of TFB functions.

Figure 3B:
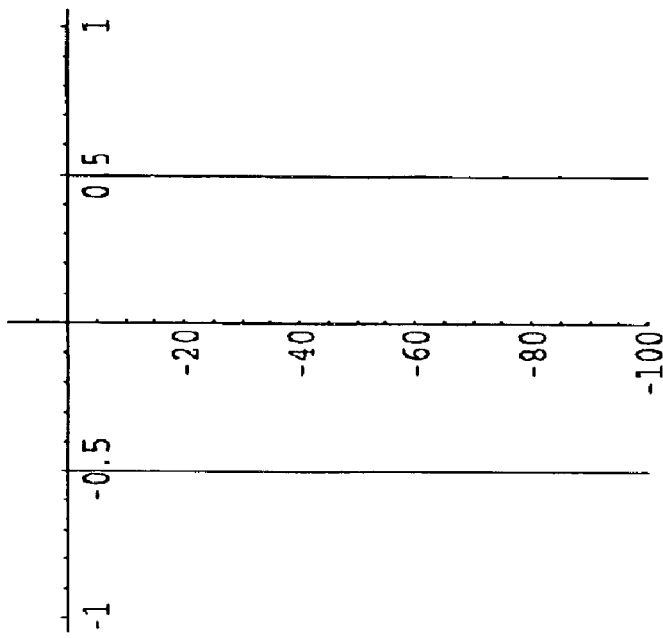
FIG. 3B is an example of a non-TFB function in the frequency domain.
Figure 3A:
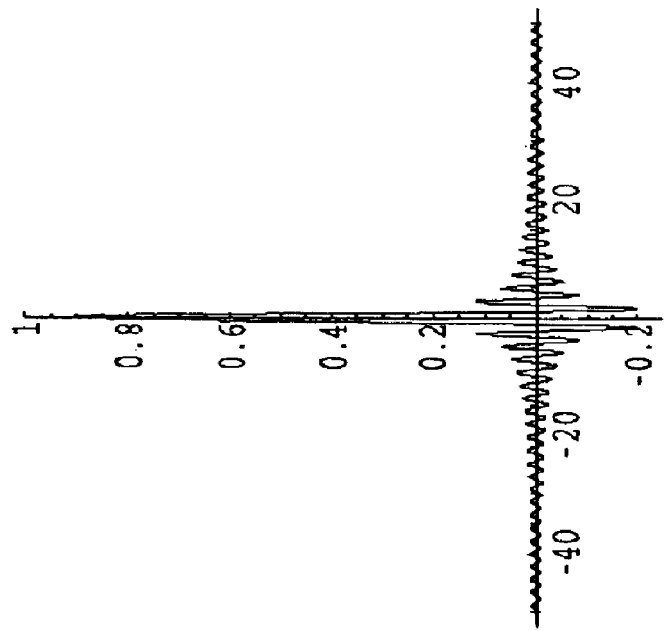
FIG. 3A is an example of a non-TFB function in the time domain.

FIG. 3B is an example of a non-TFB function, in the frequency domain. The function of FIG. 3B is nicely confined to a rectangular slice in the frequency domain of 1 Hz wide, but its Fourier transform, the Sinc function, spills into plus and minus infinity in the time domain (FIG. 3A). Similarly, a function that is confined to a rectangular slice in the time domain spills into plus and minus infinity in the frequency domain.

In order to reduce the dramatic spillover of the Sinc function shown in FIG. 3A, the steep rise and fall in amplitude of the rectangular slice (FIG. 3B) can be changed to a more gradual rise and fall in amplitude by using e.g. a raised-cosine function. However, even the more gradual raised-cosine functions result in substantial spilling over. The best solution to this spillover problem is to use TFB functions, an example of which is shown in FIGS. 4A and 4B.

Figure 4B:
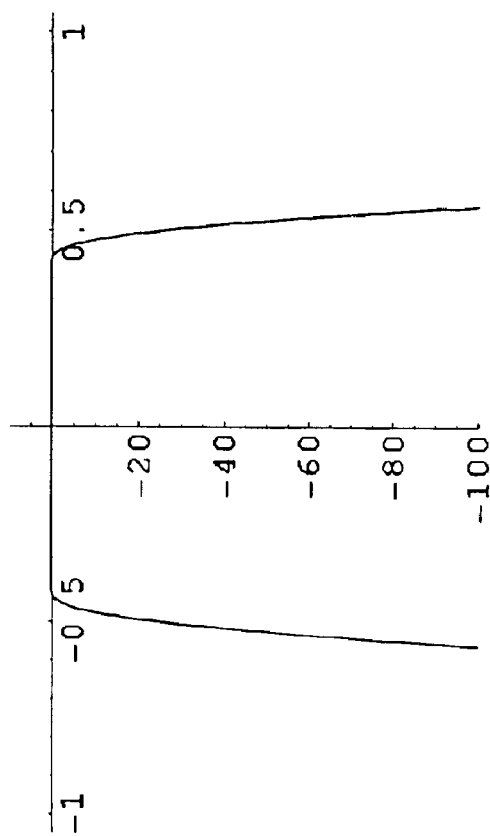
FIG. 4B is an example of a TFB function in the frequency domain.
Figure 4A:
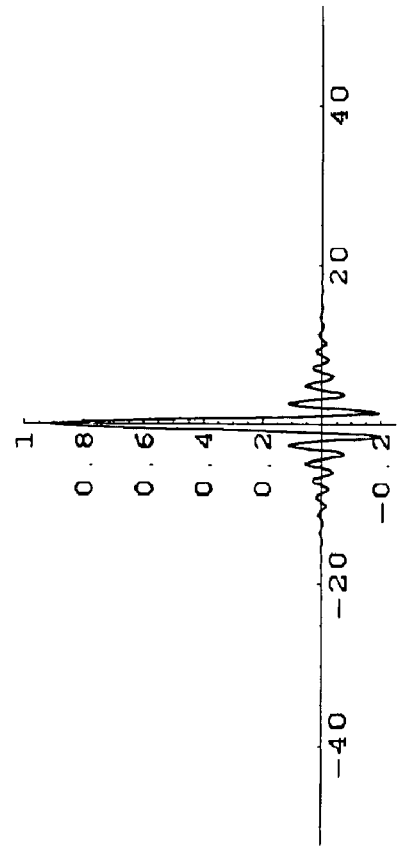
FIG. 4A is an example of a TFB function in the time domain.

FIG. 4A is an example of a TFB function in the time domain, and FIG. 4B the corresponding TFB function in the frequency domain.

Figure 5B:
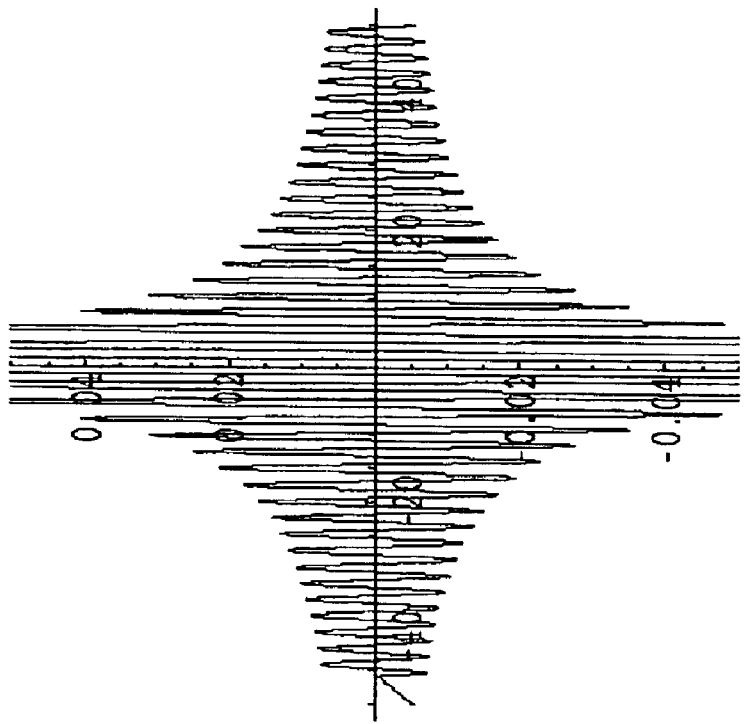
FIGS. 5A and 5B enlarge the pulse shapes presented in FIG. 4A and FIG. 3A respectively for comparison.
Figure 5A:
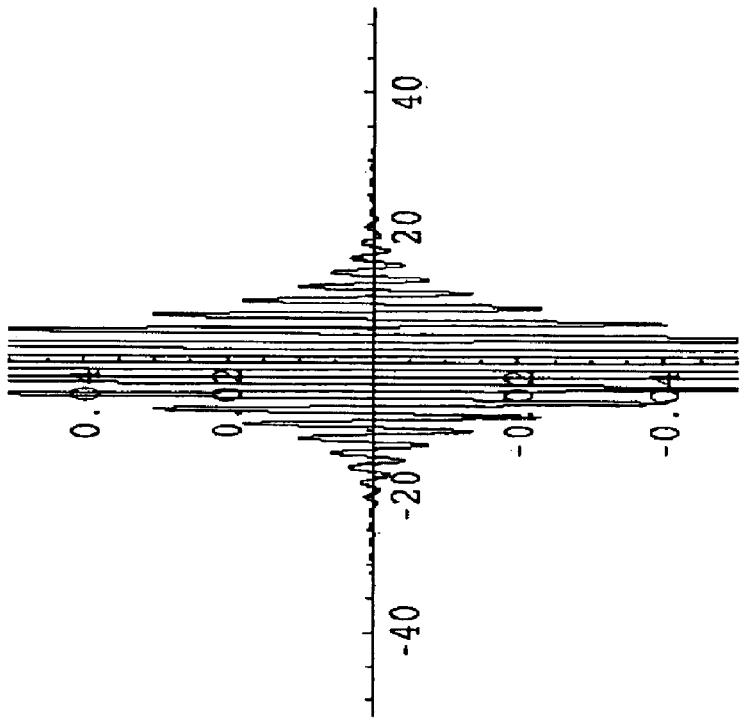

For comparison, FIGS. 5A and 5B show enlargements of the time domain graphs of the TFB function, and the Sinc function, respectively. Note that the vertical plot range is reduced with respect to FIGS. 3A and 4A in order to show the decay of local maxima.

What is claimed is:

1. A system for increasing digital data throughput by transmitting Time-and-Frequency-Bounded function packets over a transmission medium, wherein the Time-and-Frequency-Bounded functions are smooth functions, which have a limited extent in both the time domain and the frequency domain beyond which the amplitude of the product of the function and any polynomial is negligible or at least lower than a predetermined threshold value, the system comprising a transmitter, comprising:

a digital receiving mechanism to receive an incoming stream of digital information on at least one incoming digital lines, the digital information being in a binary bit format of "0"s and "1"s, a weighing mechanism to generate respective weighing factors using the digital information;

a signal generation mechanism equipped to generate a plurality of Time-and-Frequency-Bounded functions;

a mapping mechanism, coupled to the signal generation mechanism, to apply weighing factors generated by the weighing mechanism to a corresponding Time-and-Frequency-Bounded function, and subsequently summing the weighted Time-and-Frequency-Bounded functions to thereby generate a corresponding plurality of Time-and-Frequency-Bounded packets, the plurality of Time-and-Frequency-Bounded packets comprising a Time-and-Frequency-Bounded information stream; and a transmission mechanism to transmit the plurality of Time-and-Frequency-Bounded packets over the transmission medium.

2. The system of claim 1, wherein the receiving mechanism comprises means for buffering the incoming stream and means for grouping the bits in groups.

3. The system of claim 2, wherein the system is arranged to determine the number of bits in a group dynamically.

4. The system of claim 2, wherein the means for grouping the bits are arranged to add one or more padding bits in case there is insufficient data in the incoming stream of information to fill a group.

5. The system of claim 2, comprising an error correction mechanism arranged to add error correction bits to the bit groups.

6. The system of claim 5, wherein the system is arranged to define the number of error correction bits dynamically.

7. The system of claim 1, comprising a modulator to modulate the sum of the weighted Time-and-Frequency-Bounded functions with a carrier frequency.

8. The system of claim 5, wherein the error correction mechanism is arranged to receive information on the quality of the transmission and/or the transmission medium on an input to optimize the error correction algorithm depending on effects of the transmission medium.

9. The system of claim 1, wherein the weighing mechanism is arranged to receive information on the quality of the transmission and/or the transmission medium on an input for optimizing weight generation, given the conditions of the transmission medium.

10. The system of claim 1, wherein the transmission mechanism is arranged to transmit the Time-and-Frequency-Bounded packets in the order in which the packets were constructed.

11. The system of claim 1, wherein the transmission mechanism is arranged to transmit the Time-and-Frequency-Bounded packets in a temporally spaced fashion.

12. The system of claim 1, wherein the transmission mechanism is arranged to transmit the Time-and-Frequency-Bounded packets in a non-continuous stream.

13. The system of claim 1, wherein the signal generation mechanism is equipped to generate a plurality of digital representations of Time-and-Frequency-Bounded functions.

14. The system of claim 1, wherein the transmission medium utilizes any of twisted wire pairs, coaxial cable, optical cable, a satellite link, and a wireless link.

15. The system of claim 1, further comprising a receiver to receive an incoming information stream in the form of Time-and-Frequency-Bounded packets transmitted on the transmission medium; the receiver comprising a front end, a decoder to extract the digital information, and a generating mechanism to generate one or more outgoing binary data bit streams.

16. The system of claim 15, wherein the front end comprises a digital-to-analog converter to convert the incoming information stream into a sampled stream of bits.

17. The system of claim 15, wherein the decoder comprises a compensator to correct the sampled incoming information stream for distortions of the signal during the transmission, and determine the parameters that govern the correction.

18. The system of claim 17, wherein the receiving mechanism comprises means for buffering the incoming stream and means for grouping the bits in groups, including an error correction mechanism arranged to add error correction bits to the bit groups, wherein the error correction mechanism is arranged to receive information on the quality of the transmission and/or the transmission medium on an input to optimize the error correction algorithm depending on effects of the transmission medium; and further wherein the error correction mechanism of the transmitter is arranged to receive the parameters from the compensator of the receiver.

19. The system of claim 17, wherein the weighing mechanism is arranged to receive information on the quality of the transmission and/or the transmission medium on an input for optimizing weight generation, given the conditions of the transmission medium, and wherein the weighing mechanism of the transmitter is arranged to receive the parameters from the compensator of the receiver.

20. The system of claim 15, wherein the decoder comprises a demodulator for demodulating the Time-and-Frequency-Bounded packets.

21. The system of claim 15, wherein the decoder comprises a signal generation mechanism equipped to generate a plurality of Time-and-Frequency-Bounded functions.

22. The system of claim 21, wherein the decoder comprises a matching mechanism for matching the received information stream with the set of Time-and-Frequency-Bounded functions in order to determine the weighing factor for each function in the set.

23. The system of claim 22, wherein the Time-and-Frequency-Bounded functions used in the matching mechanism are different from the Time-and-frequency-Bounded functions used in the mapping mechanism.

24. The system of claim 15, wherein the decoder comprises an estimation mechanism for estimating information on the noise generated by and/or in the transmission medium.

25. The system of claim 24, wherein the signal generation mechanism of the receiver is arranged to receive and use the information of the estimation mechanism to adapt the generated Time-and-Frequency-Bounded functions.

26. The system of claim 24, wherein the signal generation mechanism of the transmitter is arranged to receive and use the information of the estimation mechanism to adapt the generated Time-and-Frequency-Bounded functions.

27. The system of claim 15, wherein the generating mechanism comprises an error correction mechanism for applying error correction to the one or more outgoing data streams.

28. The system of claim 15, wherein the generating mechanism comprises a buffer for the decoded bits.

29. The system of claim 15, wherein the generating mechanism comprises a mechanism for concatenating the bits and/or making the bits available for external equipment.

30. The system of claim 15, wherein at least part of the decoder is implemented in software executing in a programmable computing mechanism, such as a general purpose computer, a digital signal processor (DSP), or an FPGA.

31. The system of claim 15, wherein the matching mechanism is implemented in one or more application-specific integrated circuit chips (ASICs).

32. The system of claim 1, wherein at least one of the Time-and-Frequency-Bounded functions is chosen from the sub-class of orthogonal Time-and-Frequency-Bounded functions.

33. The system of claim 15, wherein at least one of the Time-and-Frequency-Bounded functions is chosen from the sub-class of orthogonal Time-and-Frequency-Bounded functions.

34. The system of claim 1, wherein at least one of the Time-and-Frequency-Bounded functions is chosen from the sub-class of Hermite-Gauss functions.

35. The system of claim 15, wherein at least one of the Time-and-Frequency-Bounded functions is chosen from the sub-class of Hermite-Gauss functions.

36. A method for effectively increasing digital data throughput by transmitting Time-and-Frequency-Bounded function packets over a transmission medium, wherein the Time-and-Frequency-Bounded functions are smooth functions, which have a limited extent in both the time domain and the frequency domain beyond which the amplitude of the product of the function and any polynomial is negligible or at least lower than a certain predetermined threshold value, the method comprising the steps of:

receiving an incoming stream of digital information in a binary bit format of "0"s and "1"s, using the digital information to generate a sequence of weighing factors;

generating a plurality of Time-and-Frequency-Bounded functions;

applying the weighing factors to the plurality of Time-and-Frequency-Bounded functions, and summing the weighted Time-and-Frequency-Bounded functions to thereby generate a corresponding plurality of Time-and-Frequency-Bounded packets, a plurality of Time-and-Frequency-Bounded packets comprising a Time-and-Frequency-Bounded information stream; and transmitting the plurality of Time-and-Frequency-Bounded packets over the transmission medium.

37. The method of claim 36, wherein the step of receiving the incoming stream comprises the buffering of the incoming stream and the grouping of bits in groups.

38. The method of claim 37, wherein the number of bits in a group is defined dynamically.

39. The method of claim 37, wherein one or more padding bits are added in case there is insufficient data in the input sequence to fill a group.

40. The method of claim 37, wherein the step of receiving the incoming stream is followed by adding error correction bits to the group.

41. The method of claim 40, wherein the number of error correction bits is defined dynamically.

42. The method of claim 36, wherein the step of summing the weighted Time-and-Frequency-Bounded functions is followed by modulating the sum of the weighted Time-and-Frequency-Bounded functions with a carrier frequency.

43. The method of claim 40, wherein the step of adding error correction bits is optimized for the effects of the transmission medium.

44. The method of claim 36, wherein the step of generating the weighing factors is optimized for the effects of the transmission medium.

45. The method of claim 36, wherein the Time-and-Frequency-Bounded packets are transmitted in the order in which the packets were constructed.

46. The method of claim 36, wherein the Time-and-Frequency-Bounded packets are transmitted temporally spaced.

47. The method of claim 36, wherein the Time-and-Frequency-Bounded packets are transmitted in a non-continuous stream.

48. The method of claim 36, wherein the Time-and-Frequency-Bounded functions are generated as representations in the digital domain.

49. The method of claim 36, wherein the transmission medium utilizes any of twisted wire pairs, coaxial cable, optical cable, a satellite link, and a wireless link.

50. The method of claim 36, further comprising the steps of receiving an incoming information stream in the form of Time-and-Frequency-Bounded packets transmitted on the transmission medium; decoding the incoming information stream into one or more Time-and-Frequency-Bounded functions, and generating one or more outgoing binary data bit streams.

51. The method of claim 50, wherein the step of receiving the incoming information stream comprises converting the incoming information stream into a sampled stream of bits.

52. The method of claim 50, wherein the step of receiving the incoming information stream comprises correcting the incoming information stream for distortions of the signal during the transmission, and determining the parameters that govern the correction.

53. The method of claim 52, wherein the step of receiving the incoming stream comprises the buffering of the incoming stream and the grouping of bits in groups, followed by adding error correction bits optimized for the effects of the transmission medium to the group, wherein the step of adding error correction makes use of the parameters that govern the correction determined in the step of correcting the incoming information stream.

54. The method of claim 52, wherein the step of generating the weighing factors is optimized for the effects of the transmission medium and also makes use of the parameters that govern the correction determined in the step of correcting the incoming information stream.

55. The method of claim 50, wherein the step of decoding comprises demodulating the Time-and-Frequency-Bounded packets.

56. The method of claim 50, wherein the step of decoding comprises generating a plurality of Time-and-Frequency-Bounded functions.

57. The method of claim 56, wherein the step of decoding comprises matching the received information stream with the set of Time-and-Frequency-Bounded functions in order to determine the weighing factor for each function in the set.

58. The method of claim 57, wherein the Time-and-Frequency-Bounded functions used for matching are different from the Time-and-frequency-Bounded functions used for mapping.

59. The method of claim 50, wherein the step of decoding comprises estimating information on the noise generated by and/or in the transmission medium.

60. The method of claim 59, wherein information on the noise generated by the transmission medium used for adaptation of the Time-and-Frequency-Bounded functions used in the matching step.

61. The method of claim 59, wherein information on the noise generated by the transmission medium used for adaptation of the Time-and-Frequency-Bounded functions used in the mapping step.

62. The method of claim 50, wherein the step of generating one or more outgoing data streams comprises applying error correction.

63. The method of claim 50, wherein the step of generating one or more outgoing data streams comprises buffering the decoded bits.

64. The method of claim 50, wherein the step of generating one or more outgoing data streams comprises concatenating the bits and/or making the bits available for external equipment.

65. The method of claim 50, wherein the steps of decoding the received information stream into Time-and-Frequency-Bounded functions is at least partly implemented in a software executing in a programmable computing mechanism, such as a general purpose computer, a digital signal processor (DSP), or an FPGA.

66. The method of claim 50, wherein the steps of decoding the received information stream into Time-and-Frequency-Bounded functions is at least partly implemented in one or more application-specific integrated circuit chips (ASICs).

67. The method of claim 36, wherein at least one of the Time-and-Frequency-Bounded functions is chosen from the sub-class of orthogonal Time-and-Frequency-Bounded functions.

68. The method of claim 50, wherein at least one of the Time-and-Frequency-Bounded functions is chosen from the sub-class of orthogonal Time-and-Frequency-Bounded functions.

69. The method of claim 36, wherein at least one of the Time-and-Frequency-Bounded functions is chosen from the sub-class of Hermite-Gauss functions.

70. The method of claim 50, wherein at least one of the Time-and-Frequency-Bounded functions is chosen from the sub-class of Hermite-Gauss functions.

* * * * *